United States Patent

Braun et al.

[11] Patent Number: 5,904,427
[45] Date of Patent: May 18, 1999

[54] UNITIZED WHEEL HUB AND BEARING ASSEMBLY WITH LUBRICANT DISTRIBUTING VANES

[75] Inventors: Barry E. Braun; Laurence B. Winn, both of Longview, Tex.

[73] Assignee: Stemco Inc, Longview, Tex.

[21] Appl. No.: 08/916,978

[22] Filed: Aug. 14, 1997

Related U.S. Application Data

[60] Provisional application No. 60/030,283, Nov. 4, 1996.

[51] Int. Cl.⁶ .............................. F16C 33/66; F01M 1/00
[52] U.S. Cl. ..................... 384/472; 184/13.1; 384/393; 384/473
[58] Field of Search ........................ 384/385, 393, 384/394, 462, 465, 466, 472, 473; 184/11.4, 6.26, 13.1

[56] References Cited

U.S. PATENT DOCUMENTS

| | | | |
|---|---|---|---|
| 822,046 | 5/1906 | Hobart | 384/393 |
| 1,633,806 | 6/1927 | Crawford | 384/393 |
| 1,685,517 | 9/1928 | Baldwin | 384/393 |
| 2,080,744 | 5/1937 | Rogers | 384/385 X |
| 2,264,635 | 12/1941 | Graham | 384/473 |
| 3,425,760 | 2/1969 | Gordon | 384/563 |
| 3,436,134 | 4/1969 | Gordon | . |
| 3,913,992 | 10/1975 | Scott et al. | 384/465 |
| 4,249,783 | 2/1981 | Glassmeyer | 384/472 |
| 4,648,485 | 3/1987 | Kovaleski | 184/13.1 |
| 5,328,275 | 7/1994 | Winn et al. | 384/584 X |
| 5,340,273 | 8/1994 | Rockwood | 184/6.26 X |
| 5,499,902 | 3/1996 | Rockwood | 415/113 |
| 5,591,020 | 1/1997 | Rockwood | 417/423.13 |

FOREIGN PATENT DOCUMENTS

| | | |
|---|---|---|
| 0 126 607 A2 | 11/1984 | European Pat. Off. . |
| WO 93/07013 | 4/1993 | WIPO . |

*Primary Examiner*—Thomas R. Hannon
*Attorney, Agent, or Firm*—Cummings & Lockwood

[57] ABSTRACT

A wheel hub and bearing assembly for use on the ends of a stationary axle and particularly on tractor and trailer axles. A wheel hub, a pair of bearings, a bearing spacer and seals are assembled and installed on the axle end. The bearing spacer is positioned between the pair of bearings and has one or more vanes mounted thereon for redirecting the flow of lubricant disposed in a cavity in the wheel hub between the bearings in a bi-axial flow direction towards each spaced bearing to lubricate and cool the bearings.

13 Claims, 7 Drawing Sheets

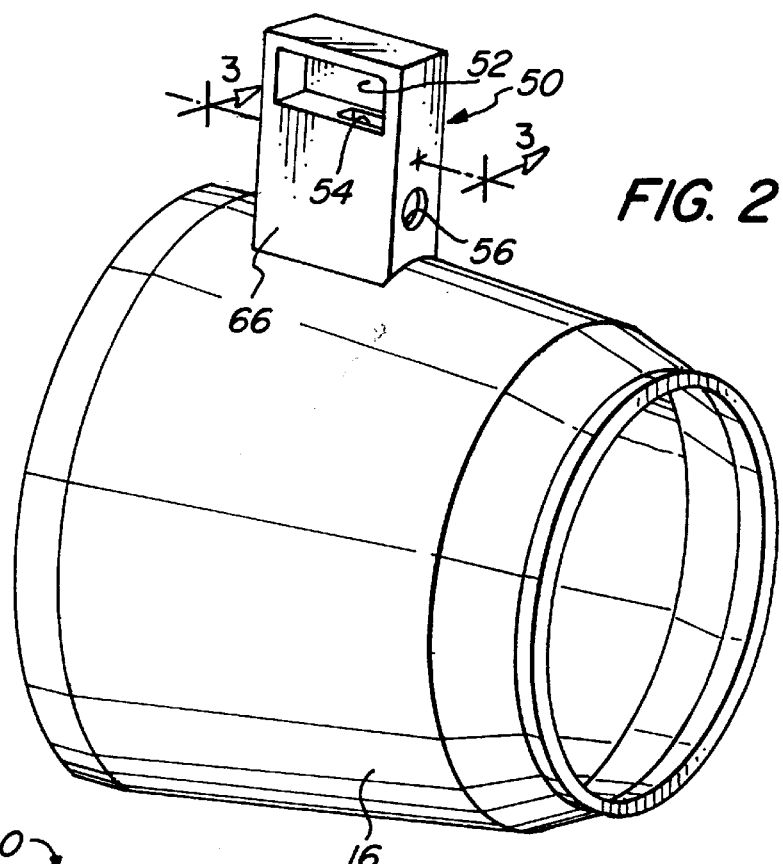
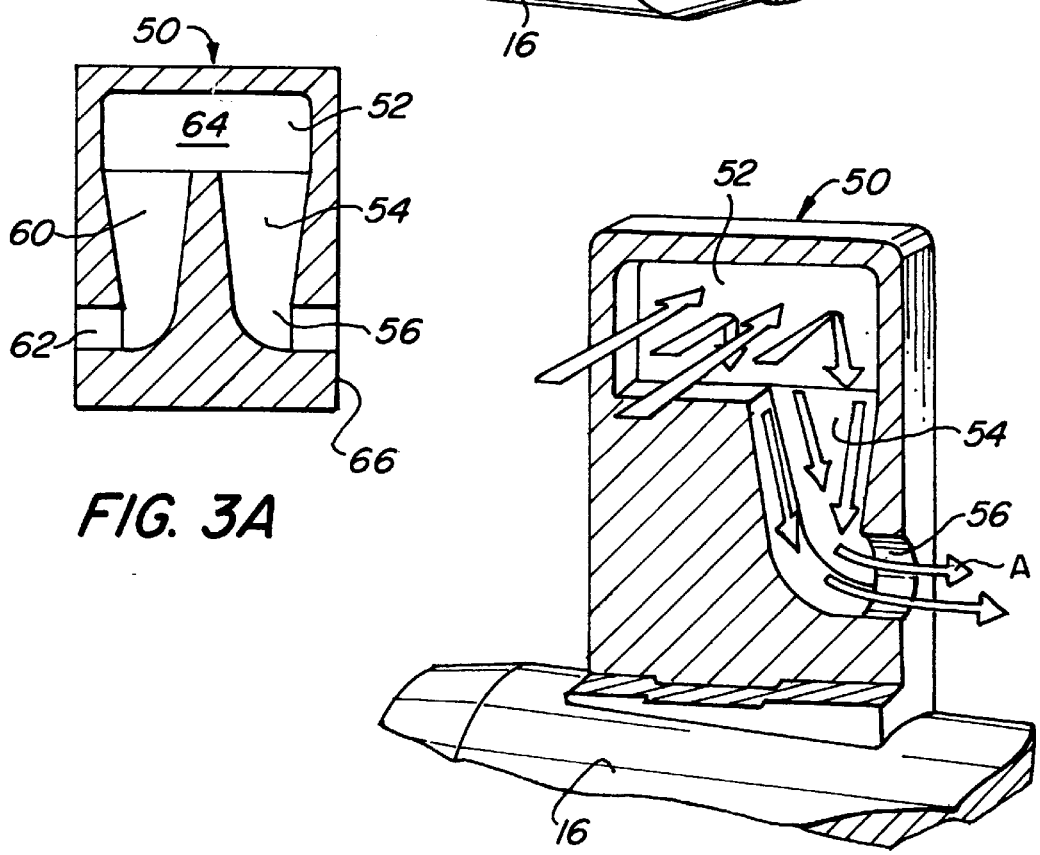
FIG. 2
FIG. 3A
FIG. 3

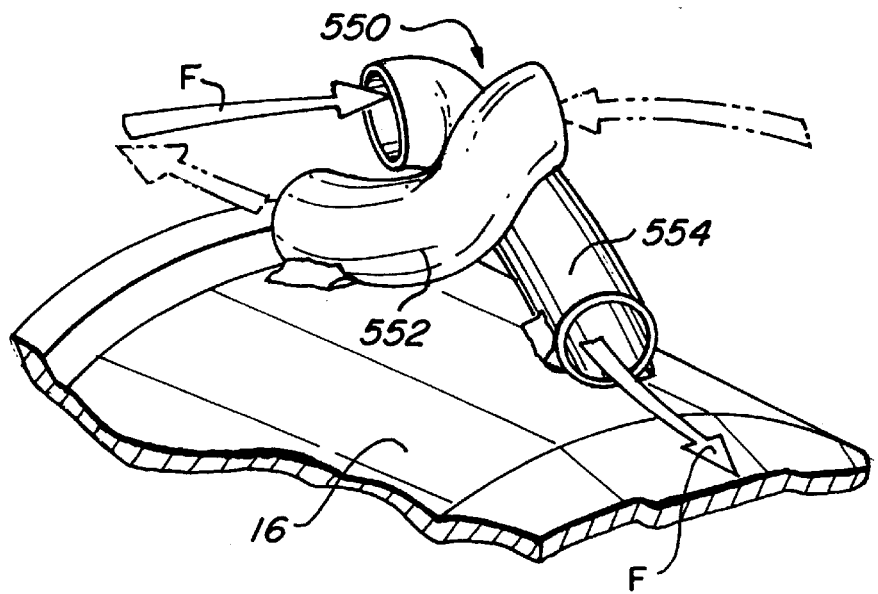
FIG. 17
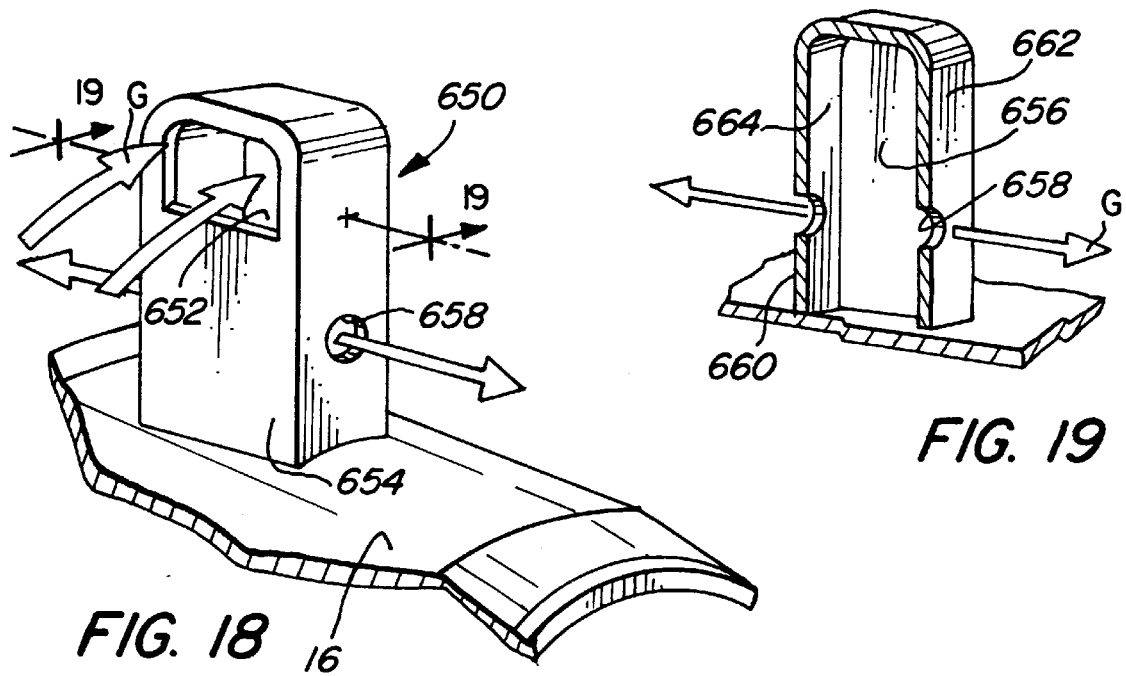
FIG. 18
FIG. 19

UNITIZED WHEEL HUB AND BEARING ASSEMBLY WITH LUBRICANT DISTRIBUTING VANES

RELATED APPLICATIONS

This application claims priority to a provisional patent application Ser. No. 60/030,283, filed Nov. 4, 1996.

BACKGROUND OF THE INVENTION

1. Field of the Invention

This invention relates to an improved unitized wheel hub and bearing assembly for mounting on the ends of vehicle axles. More particularly, the improved assembly includes a pair of bearings, a bearing spacer, at least one seal and a wheel hub. By means of the assembly, the various elements may be pre-adjusted for controlling the bearing settings and, when two seals are used, may be prelubricated. Vanes are provided in the hub assembly to redirect lubricant motion from tangential to axial, as well as splitting the axial flow from unidirectional to bi-directional so as to improve lubricant distribution to the bearings to insure adequate cooling to extend their useful bearing life in the hub.

2. Description of Prior Art

In wheeled vehicles of all types, it is necessary to provide bearings for axles so that associated wheel hubs may rotate freely on the end of a relatively stationary axle. Such bearings must be lubricated and seals are required to retain the lubricating medium whether it be grease or oil. Frequently, wear sleeves are employed to prevent undue wear of the axle by the seals. Sometimes, such wear sleeves have been separate elements and sometimes they have been an integral part of a unitized seal.

Until quite recently, such bearing, seal and wheel hub means have been assembled piece by piece. The bearing races have been fitted to designated axle portions and corresponding portions of the associated wheel hub. The bearing elements are usually spaced as far apart axially as possible with a tapered axle portion between these elements. The assembly also includes one or two seals, depending upon the particular design. These wheel hub assemblies have typically provided long lasting performance when assembled properly. However, such an assembly process requires skilled personnel and proper equipment to achieve proper installation and operation. If repair or replacement of any part becomes necessary, correct positioning and adjustment of all elements becomes even more of a challenge and damaged parts are a quite likely result. Typical prior art assemblies are illustrated in U.S. Pat. No. 4,552,367 assigned to Garlock Inc. and U.S. Pat. No. 4,037,849 assigned to The Mechanex Corp.

A non-unitized wheel hub assembly requires the components to be assembled and installed on site by a mechanic working on an axle spindle. The nature of the assembling process, and the generally horizontal orientation of the spindle during assembly, makes it difficult to fill the assembly with a liquid such as oil and the non-unitized wheel hub assembly must be lubricated with packing grease or oil filled after installation. Therefore, there was a need for a unitized wheel hub assembly which allows the assembly to be pre-filled with oil to achieve superior lubrication characteristics in contrast to the non-unitized assemblies.

More recently, some efforts have been made to develop assemblies which permit more of the various elements to be pre-assembled and adjusted, thus resulting in less dependence on the skills of the field mechanic. One such attempt has been the SAF Euro-axle developed by the Otto Sauer Achsenfabric of Keilber, Germany. These units accomplish much in terms of allowing factory assembly and adjustments of sealed bearing units and avoidance of so much dependence on the skills of the field mechanic. However, these units are not constructed to allow prefilling with oil which is a preferred bearing lubricant as compared to grease. More significantly, a special axle is included in the assembly and the pre-assembled units cannot be adapted to the millions of existing axles presently in service.

Another recent effort at development of pre-assembled and pre-adjusted sealing bearing units has been made by SKF Sweden. However, as with SAF units described previously, the SKF units are not adapted to prefilling with oil lubrication and they are not adaptable to the millions of existing axis. Furthermore, since the bearing units are more closely located relative to one another, there can be a tendency toward lessened wheel stability in operation.

One recent effort at development of pre-assembled and pre-adjusted sealing bearing units which are prefilled with oil lubrication is illustrated in U.S. Pat. No. 5,328,275 assigned to Stemco Inc., the assignee of the present invention. These units also provide the advantage of being adaptable to the millions of existing axles. However, these units are installed onto the axle and held in axially proper position by the tightening of a spindle nut onto the axle spindle. The clamp load exerted from the tightening of the spindle nut is transmitted through a mounting sleeve to the spindle shoulder, wherein the degree to which the spindle nut is tightened should be within predetermined tolerances. However, the amount of clamp load exerted could undesirably vary from the desired tolerance range if the end user fails to comply. The thickness of the mounting sleeve wall is relatively thin as compared to the bearing inner races, and the tensile stresses resulting from the clamp load can cause damage to the mounting sleeve if the clamp load exceeds the design limits on the sleeve.

In U.S. patent application Ser. No. 08/604,196 filed on or about Apr. 18, 1996, now abandoned, and assigned to Stemco, Inc. also the assignee of the present invention, there is disclosed a unitized wheel hub and bearing assembly in which the bearing setting can be predetermined precisely by a spacer installed as part of the manufacturing process so that there is no variation in the bearing between different users installing the assembly, wherein the assembly can also be pre-filled with a lubricant. However, means must be provided to adequately direct oil to lubricate and cool the spaced and fixed bearings to prolong their useful life. This invention addresses this problem.

SUMMARY OF THE INVENTION

In accordance with the invention, vanes are mounted to a bearing spacer between the two opposed bearings. The vanes will redirect oil that is traveling at a rotational velocity tangential to the outside diameter of the hub cavity, radially inward, and then axially forward and backward towards the bearings.

Accordingly, it is the primary object of the present invention to provide a unitized wheel hub and bearing assembly where the bearings are adequately lubricated to extend their useful life.

This is achieved by providing a unitized wheel hub and bearing assembly which includes a pair of bearing elements with inner races mounted on the mounting sleeve and outer races mounted in a special wheel hub, axially inner and outer sealing means and suitable adjusting means. The complete assembly further includes a bearing spacer positioned between the bearing elements in order to position the bearing elements in precise axial relationship to each other. The mounting sleeve is made with an elongated portion preferably, but not necessarily, of uniform outside diameter to accommodate bearings of uniform size and, when appropriate, with a radially inwardly extending portion at its axially outer end to compensate for reduced diameter portions of the axle. The bearing spacer is of the same general shape as the mounting sleeve so that the bearing spacer fits over the exterior of the mounting sleeve, wherein the clamp load exerted by a nut fastening the complete assembly to an axle is transmitted through the bearing spacer. The mounting sleeve of the present invention allows the assembly to be pre-filled with oil between inner and outer sealing means. The assembly also includes means for directing the flow of oil lubricant in order to improve heat transfer and reduce the likelihood of operating "hot spots."

The means for directing the flow of oil lubricant includes vanes mounted on the bearing spacer to redirect the lubricant flow from tangential to the spacer to axial, as well as splitting the axial flow from unidirectional to bi-directional so as to improve lubricant distribution to the bearings to insure adequate cooling to extend the useful bearing life in the hub.

BRIEF DESCRIPTION OF THE DRAWINGS

Further objects and advantages of the present invention will become more apparent from the following description and claims and from the accompanying drawings, wherein:

FIG. 2 is a perspective view of a bearing spacer of the unitized wheel hub and bearing assembly of FIG. 1 having an oil distribution vane in accordance with a first embodiment of the present invention;

FIG. 3 is a cross-sectional view of the oil distribution vane of FIG. 2 taken substantially along the plane indicated by line 3—3 of FIG. 2;

FIG. 3A is a view similar to FIG. 3, but illustrating an oil distribution vane in accordance with another embodiment of the present invention;

FIG. 17 is a view similar to FIG. 7, but illustrating yet another embodiment of the oil distribution vane assembly of the invention;

FIG. 18 is a view similar to FIG. 7, but illustrating still another embodiment of an oil distribution vane of the invention; and FIG. 19 is a cross-sectional view taken substantially along the plane indicated by line 19—19 of FIG. 18.

DETAILED DESCRIPTION OF THE PREFERRED EMBODIMENTS

Figure 1:
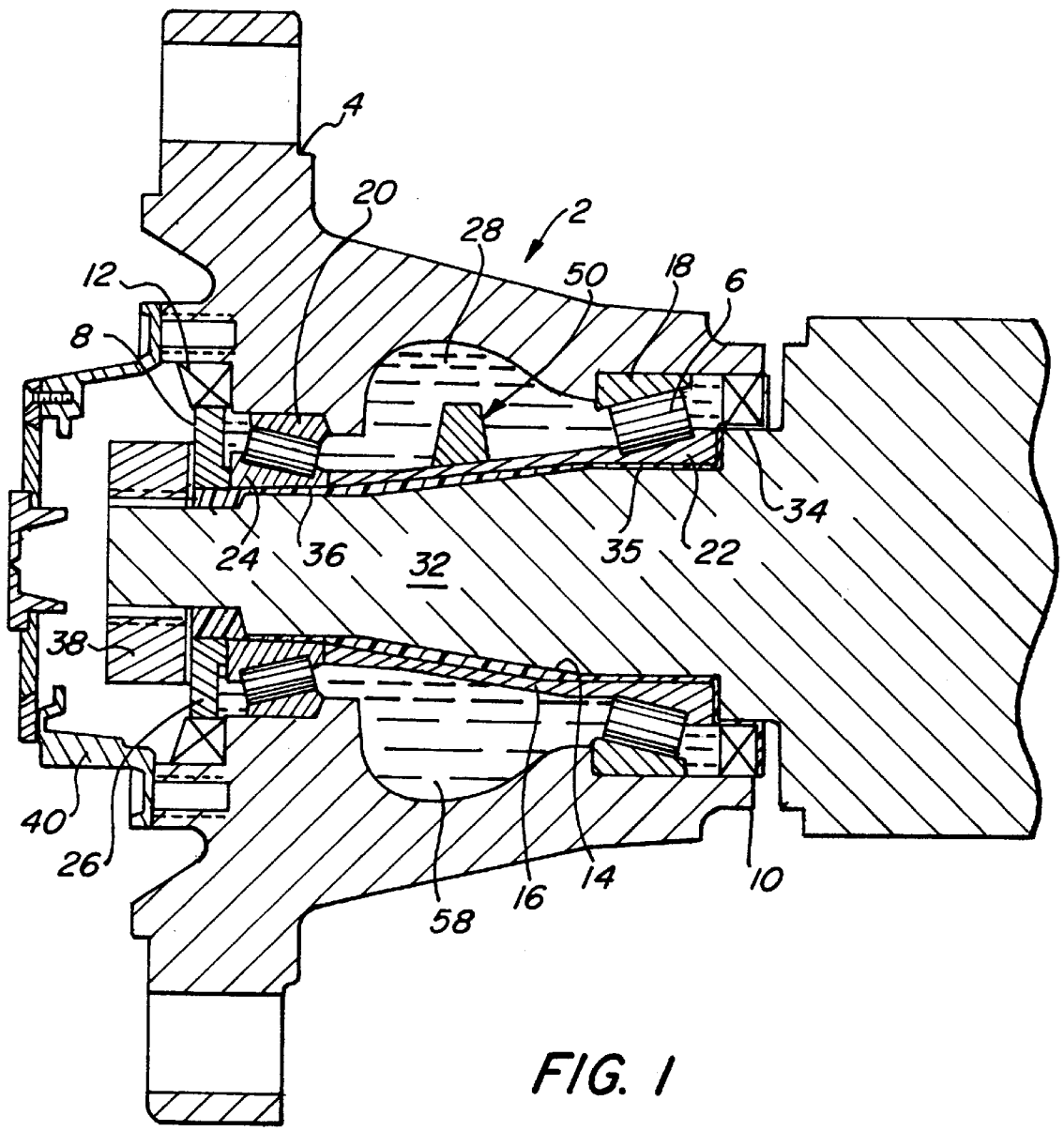
FIG. 1 is a cross-sectional view of the unitized wheel hub and bearing assembly having an oil distribution vane in accordance with the present invention.

Referring now to the drawings in detail wherein like numerals indicate like elements throughout the several views, FIG. 1 shows a unitized wheel hub and bearing assembly 2 comprising primarily a wheel hub 4, axially inner and outer bearings 6 and 8, axially inner and outer seals 10 and 12 and a mounting sleeve 14. Radially outer bearings races 18 and 20 of inner and outer bearings 6 and 8, respectively, are pressed into bores within wheel hub 4 and radially inner bearing races 22 and 24 are fitted into the primarily radially outer cylindrical surface of mounting sleeve 14. A bearing spacer 16 is further positioned onto the outer surface of mounting sleeve 14 between the inner bearing races 22, 24 of bearings 6 and 8, respectively, wherein the bearing spacer 16 positions the inner bearing races 22 and 24 in precise axial relationship to each other, along with their respective outer races 18, 20. Inner seal 10 is mounted between wheel hub 4 and mounting sleeve 14. A lock nut 26 is positioned on a threaded portion of mounting sleeve 14 and assures that the bearings maintain their proper position by applying axial compressive force to inner race 24, and through bearing spacer 16, onto inner race 22. Outer seal 12 is mounted between wheel hub 4 and an outer cylindrical surface of lock nut 26.

Wheel hub 4, inner seal 10, mounting sleeve 14, lock nut 26 and outer seal 12 cooperate to form a sealed cavity 28 which contains bearings 6 and 8 and which is filled with bearing lubricant. The lubricant may be grease or oil, but in most instances, oil is preferred. One or more vanes 50 are positioned on bearing spacer 16. The vane 50 serves to direct flow of the lubricant to the bearings as described hereinafter, thus helping to insure that lubrication and cooling of the bearings is maintained at all times.

Rather than position vane 50 on bearing spacer 16, it could be physically attached to mounting sleeve 14 or even axle end 32 in the absence of a spacer or mounting sleeve, which may be the case in some applications, as discussed above. Alternatively, the vane could fit through an opening in the spacer 16.

In practice, all of the members described thus far are assembled to form the unitized wheel hub and bearing assembly 2 ready for installation on an axle end as shown at 32. In order that assembly may be solidly mounted on axle end 32, the mounting sleeve 14 is made with inner cylindrical surfaces dimensioned so as to locate upon portions of axle end 32. In the embodiment shown, those surfaces are at 34, 35 and 36. The entire assembly is positioned on axle end 32 and held in axially proper position by spindle nut 38. Since bearing adjustment is accomplished by clamping and positively locking lock nut 26 at the time of assembly, no adjusting is required in the field to assure proper operation. Dust cap 40 is mounted on the end of the wheel hub to protect the axially outer portions of assembly from road debris, dust, rain and any other potential contaminants. The cavity of hub 4 may be pre-filled with a lubricant at any time prior to installation on axle end 32.

FIGS. 2 and 3 show one configuration 50 of the oil vane mounted on the bearing spacer 16. The vane includes a lubricant directing passage comprising a transverse port 52 for receiving lubricant, a radial passageway 54 for directing lubricant flow from the transverse port in a radially inward direction, and an axial port 56 for directing lubricant flow from the radial passageway in an axial direction with respect to the longitudinal axis of the wheel hub 4 towards the outer bearings 8. Whereby, the vane 50 redirects the lubricant in the cavity of hub 4 flowing tangentially about the bearing spacer 16 towards the outer bearing 8, as indicated by the arrows A in FIG. 3 depicting the flow. As shown, the transverse port, or entrance, 52 of the lubricant directing passage has a larger cross-sectional area than a cross-sectional area of the axial port, or exit, 56 of the passage.

A second vane 50 can, if desired, be located on the opposite radial side of the bearing spacers 16 to direct the flow of lubricant axially towards bearing 6, by turning the passage 56 to open towards inner bearing 6. In the absence of a bearing spacer 16, any of the vanes 50 can be mounted directly on axle end 32 or mounting sleeve 14.

Alternatively, as shown in FIG. 3A the lubricant directing passage of the vane 50 can further include a second radial passageway 60 for directing lubricant flow from the transverse port 52 in a radially inward direction, and a second axial port 62 for directing lubricant flow from the second radial passageway in an axial direction with respect to the longitudinal axis of the wheel hub 4 towards the inner bearings 6. The arrows A depict the path the lubricant takes when it encounters the vane 50. The vane 50 is stationary or static with its transverse port 52 immersed into the rotating pool of oil 58 inside the hub 4 of assembly 2. The flow of oil illustrated in FIGS. 2, 3 and 3A assumes a clockwise direction of rotation for the hub 4, as viewed from the left hand end of FIG. 1. As shown, the transverse port, or entrance, 52 of the lubricant directing passage has a larger cross-sectional area than a combined cross-sectional area of the axial port, or exit, 56 and the second axial port, or exit, 62 of the passage.

Figure 4:
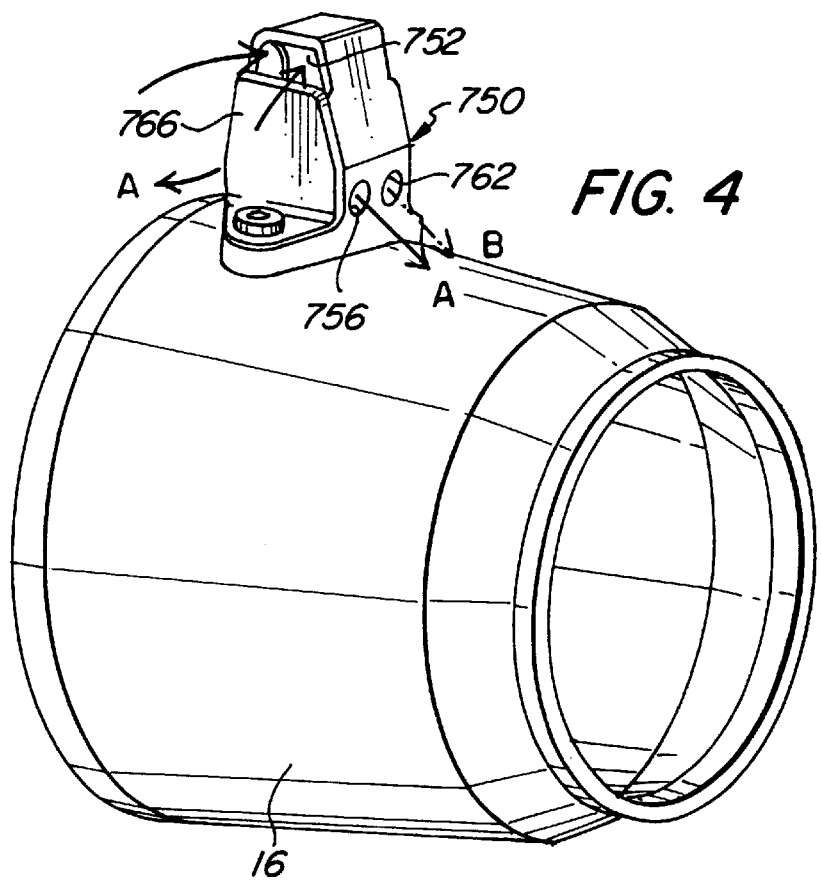
FIG. 4 is a view similar to FIG. 2 illustrating a bearing spacer having an oil distribution vane which will operate to produce lubricant flow to the bearings, regardless of the direction of rotation of the wheel hub.
Figure 5:
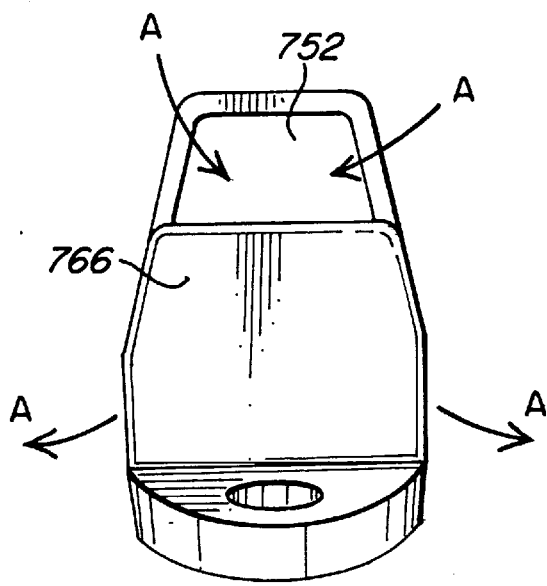
FIG. 5 is a side view in elevation of the oil distribution vane of FIG. 4, as seen from the left hand side of FIG. 4.
Figure 6:
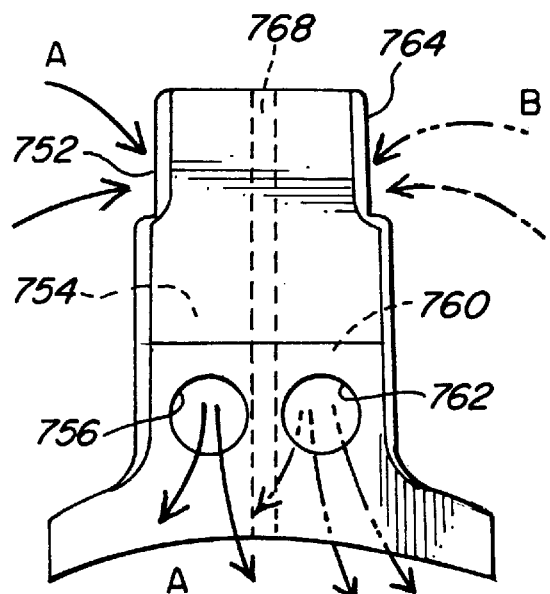
FIG. 6 is a front view in elevation of oil distribution vane of FIG. 4.

If hub assembly 2 is rotated in a counter clockwise direction, as it normally would be if the truck travels in reverse, or as it would turn on the opposite side of the truck, the vane 750 as illustrated in FIGS. 4 to 6 and associated oil passages in this event, are mirrored from the back side of the vane body 64. In other words, a window is formed in heretofore solid vane body planer surface 64, resulting in a second transverse port 764 spaced from transverse port 752 by a dividing wall 768, rather than just in opposed plane surface 66. Oil flow to the bearings 6, 8 is thus accomplished regardless of the rotational direction of the wheels and can be accomplished with only one vane 750, as illustrated in FIGS. 4 and 6, as oil would flow tangentially depending on the direction of rotation, either through transverse ports 752 or 764, (see arrows A, B in FIG. 6), through connected radial passageways 754 and 760, and axially out axial ports 756 or 762, respectively, as also illustrated by arrows A and B in FIGS. 5 and 6. There are two aligned axial ports 756 and 762 on the front and back surfaces of vane 750 in communication with its respective radial passageways 756, 760 to assure lubrication of both bearings 6, 8, regardless of the direction of rotation of hub assembly 2. This would preclude the need for a vane 50 mounted with its window 52 facing in the opposite direction on the hub assembly 2 attached to the other end of the truck axle. The vane 50 can be manufactured by metal casting, rubber molding, or plastic injection molding. As shown in FIGS. 4–6, for each lubricant directing passage, the transverse ports, or entrances, 752, 764 have a larger cross-sectional area than a combined cross-sectional area of the axial ports, or exits, 756, 762 of the passage.

Figure 7:
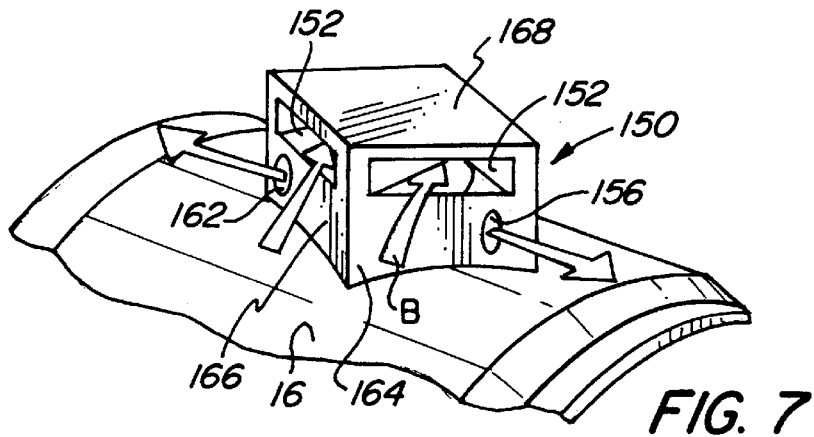
FIG. 7 is a partial perspective view similar to FIG. 2, but illustrating still another oil distribution vane embodiment of the present invention.
Figure 8:
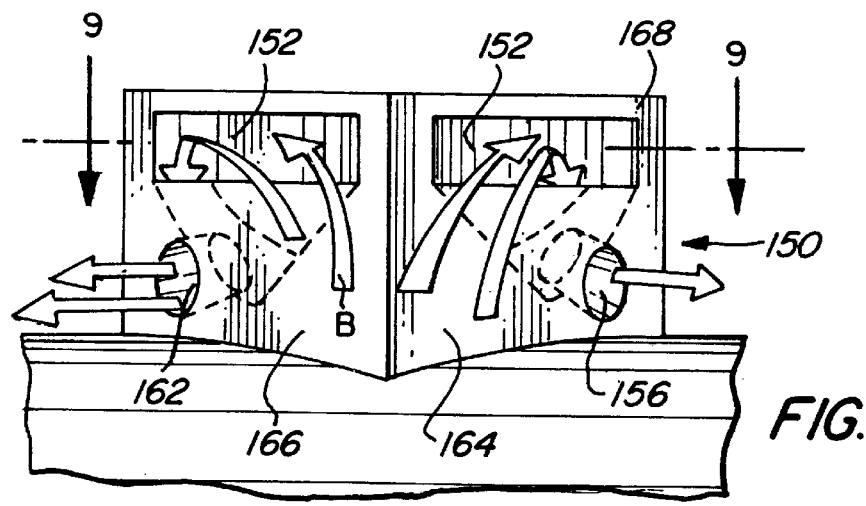
FIG. 8 is a front elevational view of the vane of FIG. 7.
Figure 9:
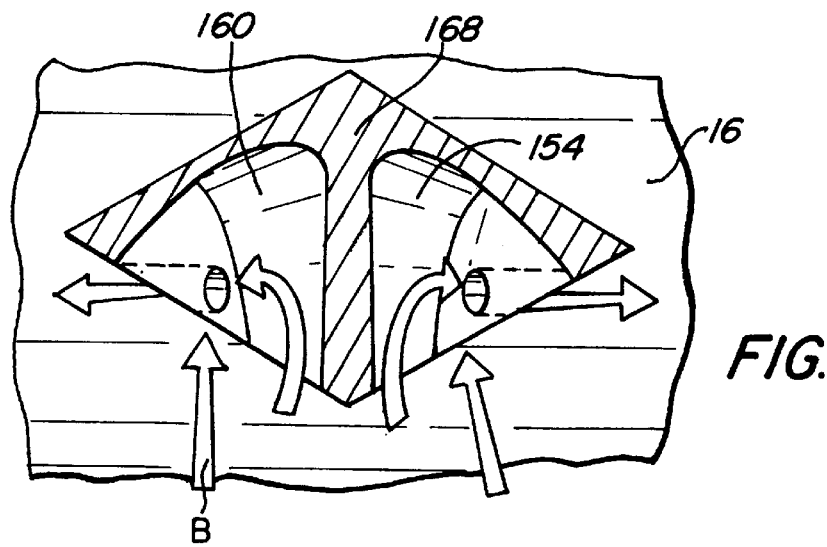
FIG. 9 is a cross-sectional views of the oil distribution vane of FIG. 8 taken substantially along the plane indicated by line 9—9 of FIG. 8.

Referring to FIGS. 7 to 9 the vane 150 can also take the form of a wedge-shaped body 168 on the bearing spacer 16. The body 168 redirects the oil from a tangential or rotational velocity to an axial velocity both in the forward and the backward direction through passages being disposed in angular relation to the tangential lubricant flow transverse ports 152, radial passageways 154, 156 and axial ports 160, 162, as indicated by the arrows B, Bi-directional axial flow is achieved through adjacent faces 164 and 166 on body 168. As shown in FIGS. 7–9, for each lubricant directing passage, the transverse ports, or entrances, 152 have a larger cross-sectional area than a cross-sectional area of the axial ports, or exits, 156, 162 of the passage. Possible manufacturing methods for this vane embodiment are metal casting, rubber molding and plastic injection molding.

Figure 10:
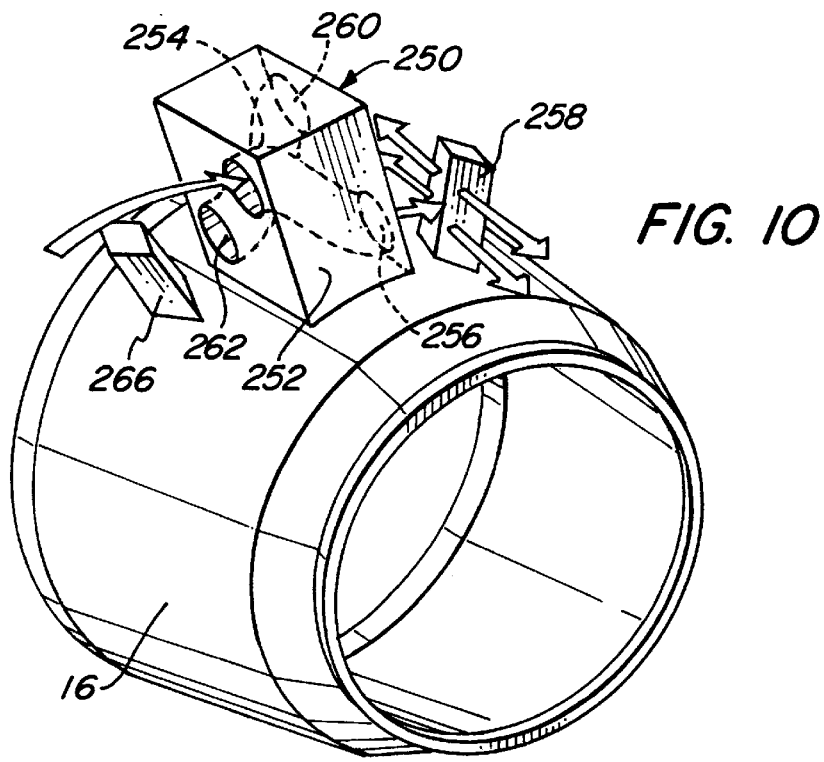
FIG. 10 is a view similar to FIG. 2 but illustrating yet another embodiment of an oil distribution vane assembly in accordance with the present invention.
Figure 11:
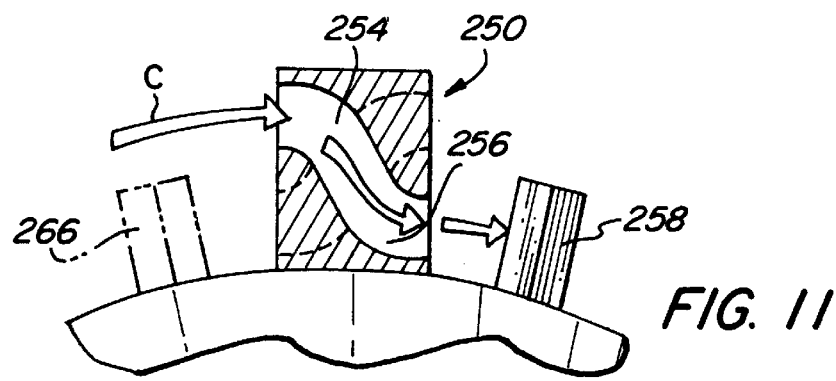
FIG. 11 is a cross-sectional view of the oil distribution vane assembly of FIG. 10.
Figure 12:
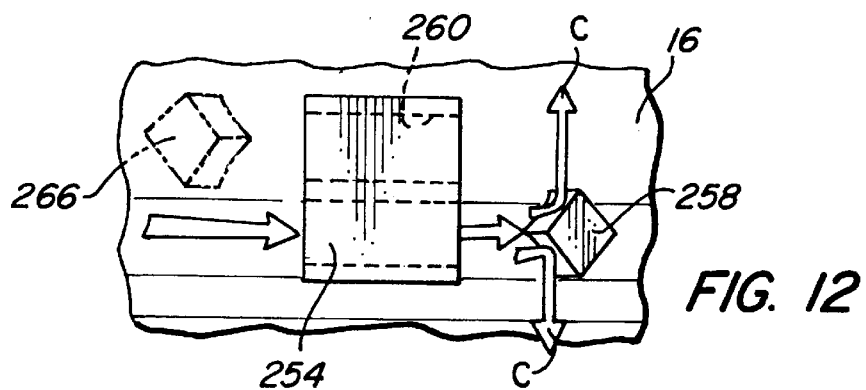
FIG. 12 is a top plan view of the vane assembly of FIG. 11.

The embodiment 250 illustrated in FIGS. 10 to 12 utilizes a three piece design. A vane 252 includes opposing faces and a passage having an entrance 254 in one face and an exit 256 in the other face. The exit 256 is spaced axially inwardly from the entrance 254 with respect to the longitudinal axis of the wheel hub. 3. The passage redirects the oil 58 radially inward from the hub cavity and causes it to impinge a first wedge shaped deflector 258 mounted at an angle to the longitudinal axis of spacer 16, that then redirects the oil forward and also backward in the axial direction, as indicated by the arrows C in FIG. 12. The vane 252 includes a second passage having an entrance 260 in the other face and an exit 262 in the first face. The exit 262 is spaced axially inwardly from the entrance 260 with respect to the longitudinal axis of the wheel hub 3. The second passage redirects the oil radially inward from the hub cavity to impinge a second wedge shaped deflector 266 when the hub 4 is rotating in the opposite direction. Deflector 266 is located adjacent passage exit 262 at an angle to the longitudinal axis of spacer 16.

Figure 13:
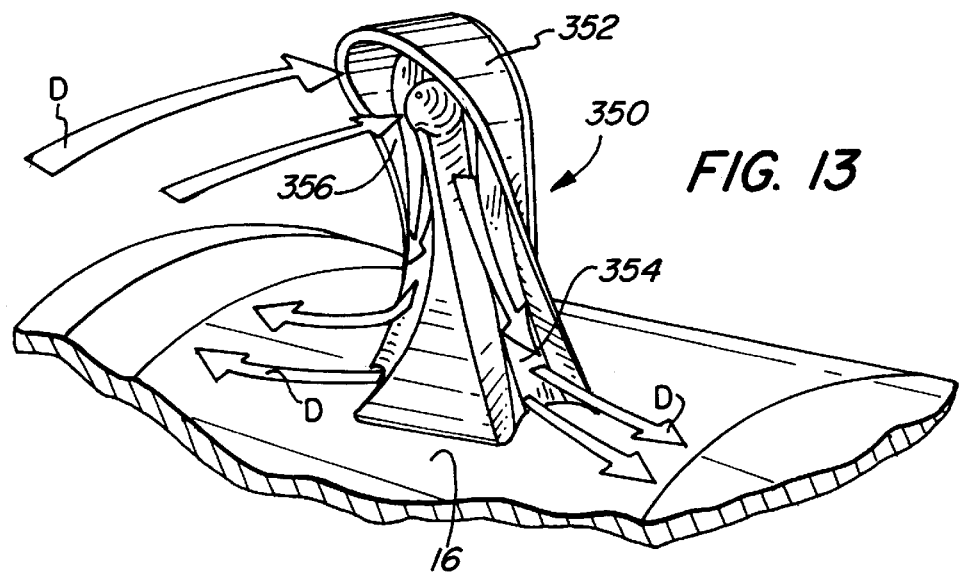
FIG. 13 is a view similar to FIG. 2, but showing another embodiment of the oil distribution vane of the present invention.

The embodiment of vane 350 illustrated in FIG. 13 utilizes a thin walled body 352 that is formed to a shape that scoops the oil near the outside diameter of the hub cavity and redirects that oil radially downward then axially forward and backward through radial and axial deflectors 354, 356, as indicated by arrows D. Two of these bodies would be placed back to back in order to achieve this behavior in both rotational directions. Possible manufacturing methods for this configuration are metal stamping, metal casting and plastic injection molding.

Figure 14:
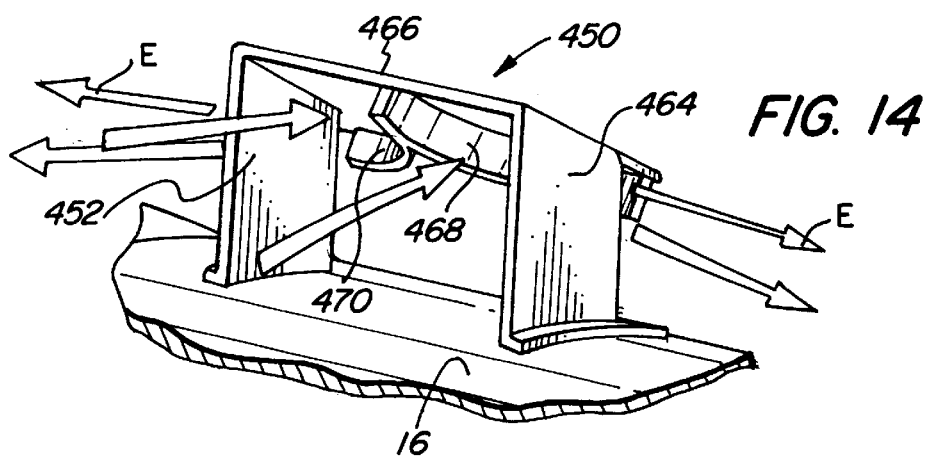
FIG. 14 is a view similar to FIG. 7, but illustrating a still further embodiment of the oil distribution vane of the present invention.
Figure 15:
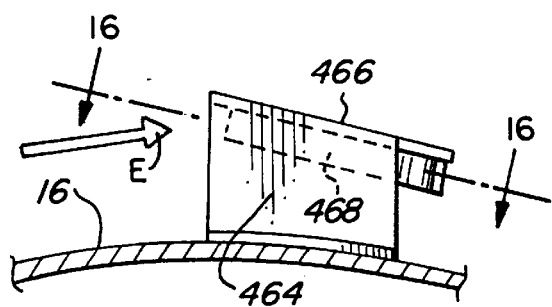
FIG. 15 is a side view in elevation of the vane of FIG. 14.
Figure 16:
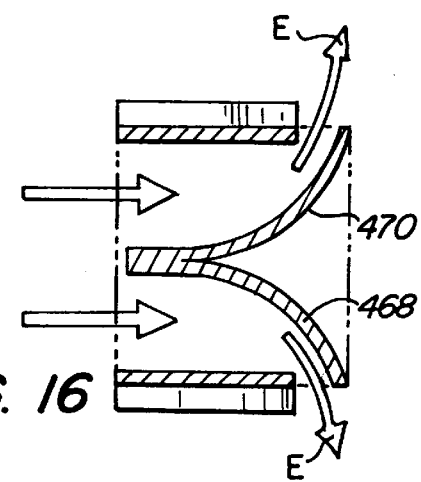
FIG. 16 is a cross-sectional view of the vane of FIG. 14 taken substantially along the plane indicated by line 16—16 of FIG. 15.

FIGS. 14 to 16 illustrate a vane 450 having a thin walled body 464 that takes oil through an open side 452 found near the outside diameter of the hub cavity and deflects that oil off radial deflector 466 and redirects that oil radially downward and then axially forward and backward against arcuate deflection surfaces 468, 470 of axial deflector as indicated by the arrow E. Surface 468 is disposed at a downward acute angle to the right of the vertical, while surface 470 is disposed a downward acute angle to the left of the vertical as shown in FIG. 14. This configuration could be a steel stamping or an injection molded plastic piece.

FIG. 17 shows a cluster 550 that utilizes formed tube steel 552, 554 that is fastened together in a group or cluster. Specifically, two tubes 552 and 554 are used to take oil found near the outside diameter of the hub cavity and are bent to redirect that oil radially downward and then axially forward or backward as indicated by the arrows F. One of the tubes 552, 554 would direct oil to the outer bearing, while a similarly oriented tube, opening in the opposite direction mounted on the opposite diameter of spacer 16, would direct oil to the inner bearing. The same would happen with the two tubes designed for counterclockwise or opposite rotation of the hub assembly, which could be provided on spacer 16 in the cluster 550 with orientation opposite to that of tubes 552, 554. These tubes would have openings facing opposite directions from that illustrated in FIG. 17.

FIGS. 18 and 19 illustrates yet another vane 650 including a lubricant directing passage comprising a transverse port 652 in body surface 654 that empties oil into a radial passageway in the form of a hollow interior 656 of the vane where it is forced downwardly radially to axial ports 658, 660 in the sides 662, 664 of the body 654, in opposite axial directions as indicated by flow arrows G. As shown, the transverse port, or entrance, 652 of the lubricant directing passage has a large cross-sectional area than a combined cross-sectional area of the axial ports, or exits, 658, 660 of the passage.

What is claimed is:

1. A wheel hub and bearing assembly mountable on a vehicle axle comprising:
   a wheel hub having a longitudinal axis;
   a pair of bearings mounted within said wheel hub, said bearings in spaced axial relation along the longitudinal axis of said wheel hub within said wheel hub;
   a lubricant cavity within said wheel hub between said axially spaced bearings adapted to be filled with a lubricant to lubricate and cool said bearings;
   a vane disposed within said lubricant cavity in said wheel hub and extending radially outwardly with respect to the longitudinal axis of said wheel hub, the vane including,
      a first passage for directing the flow of lubricant upon rotation of said wheel hub on said vehicle axle, said passage directing said flow in a radially inward direction and then to an axial direction within said lubricant cavity with respect to the longitudinal axis of said wheel hub towards one or more of said axially spaced bearings,
      a second passage for directing the flow of lubricant upon opposite rotation of said wheel hub on said vehicle axle to an axial direction with respect to the longitudinal axis of said wheel hub towards one or more of said axially spaced bearings.

2. The assembly of claim 1, including:
   a spacer positioned between said bearings for setting the axial spacing between said bearings and said vane being mounted on said spacer.

3. The assembly of claim 1 wherein the assembly includes two vanes spaced from each other in said lubricant cavity.

4. A wheel hub and bearing assembly mountable on a vehicle axle comprising:
   a wheel hub having a longitudinal axis;
   a pair of bearings mounted within said wheel hubs said bearings in spaced axial relation along the longitudinal axis of said wheel hub within said wheel hub;
   a lubricant cavity within said wheel hub between said axially spaced bearings adapted to be filled with a lubricant to lubricate and cool said bearings;
   a vane disposed within said lubricant cavity in said wheel hub and extending radially outwardly with respect to the longitudinal axis of said wheel hub, the vane including,
      a passage for directing the flow of lubricant upon rotation of said wheel hub on said vehicle axle, said passage directing said flow in a radially inward direction and then to an axial direction within said lubricant cavity with respect to the longitudinal axis of said wheel hub towards one or more of said axially spaced bearings;
      wherein said vane is wedge-shaped and is mounted within said wheel hub at an angle with respect to the longitudinal axis of said wheel hub, said vane further comprising a second passage for directing the flow of lubricant upon rotation of said wheel hub on said vehicle axle to an axial direction with respect to the longitudinal axis of said wheel hub towards the other of said axially spaced bearings, the second passage having a transverse port, wherein the transverse ports of the passages are provided in adjacent faces of said vane.

5. A wheel hub and bearing assembly mountable on a vehicle axle comprising:
   a wheel hub having a longitudinal axis;
   a pair of bearings mounted within said wheel hub, said bearings in spaced axial relation along the longitudinal axis of said wheel hub within said wheel hub;
   a lubricant cavity within said wheel hub between said axially spaced bearings adapted to be filled with a lubricant to lubricate and cool said bearings;
   a vane disposed within said lubricant cavity in said wheel hub and extending radially outwardly with respect to the longitudinal axis of said wheel hub, the vane including:
      a first transverse port for receiving lubricant upon rotation of said wheel hub on said vehicle axle,
      a first radial passageway for directing lubricant flow from said first transverse port in a radially inward direction,
      a first axial port for directing lubricant flow from said first radial passageway in an axial direction with respect to the longitudinal axis of said wheel hub towards one of said axially spaced bearings,
      a second axial port for directing lubricant flow from said first radial passageway in an axial direction with respect to the longitudinal axis of said wheel hub towards the other of said axially spaced bearings,
      a second transverse port open in an opposite direction of rotation of said wheel hub,
      a second radial passageway for directing lubricant flow from said second transverse port in a radially inward direction,
      a third axial port for directing lubricant flow from said second radial passageway in an axial direction with respect to the longitudinal axis of said wheel hub towards one of said axially spaced bearings, and
      a fourth axial port for directing lubricant flow from said first radial passageway in an axial direction with respect to the longitudinal axis of said wheel hub towards the other of said axially spaced bearings.

6. The assembly of claim 5 wherein each axial port of said vane has a smaller cross-sectional area than the transverse port.

7. A wheel hub and bearing assembly mountable on a vehicle axle comprising:

a wheel hub having a longitudinal axis;

a pair of axially spaced bearings mounted within said wheel hub;

a lubricant cavity within said wheel hub between said axially spaced bearings adapted to be filled with a lubricant to lubricate and cool said bearings;

a cluster of two tubes disposed within said lubricant cavity in said wheel hub and extending axially, and radially outwardly, with respect to the longitudinal axis of said wheel hub, wherein one of said tubes is shaped to direct lubricant in a radially inward direction and then in an axial direction within the lubricant cavity, with respect to the longitudinal axis of the wheel hub, towards one of said bearings when said hub rotates in a first direction on said vehicle axle, and the other of said tubes is shaped to direct lubricant in a radially inward direction and then in an axial direction within the lubricant cavity, with respect to the longitudinal axis of the wheel hub, towards the other of said bearings when said hub rotates in a second direction on said vehicle axle.

8. A unitary wheel hub and bearing assembly mountable on a vehicle axle comprising:

a wheel hub having a longitudinal axis;

a pair of axially spaced bearings mounted within said wheel hub;

a lubricant cavity within said wheel hub between said axially spaced bearings adapted to be filled with a lubricant to lubricate and cool said bearings;

a vane disposed within said lubricant cavity in said wheel hub and extending radially outwardly with respect to the longitudinal axis of said wheel hub, the vane including, a radial deflector for deflecting lubricant flow upon rotation of said wheel hub on said vehicle axle in a radially inward direction, and an axial deflector for deflecting lubricant flow from said radial deflector in an axial direction with respect to the longitudinal axis of said wheel hub towards one or more of said axially spaced bearings, wherein the axial deflector includes two surfaces for deflecting lubricant flow from said radial deflector in an axial direction with respect to the longitudinal axis of said wheel hub towards both of said inner and said outer axially spaced bearings; and a second vane oriented for directing the flow of lubricant upon rotation of said wheel hub in an opposite direction.

9. The assembly of claim 8 further including a spacer positioned between said bearings for setting the axial spacing between said bearings, and wherein said vanes are mounted on said spacer.

10. An oil directing vane for mounting between inner and outer bearings within a lubricant cavity of a wheel hub coaxially secured on an axle, the vane configured to extend radially outwardly with respect to the axle, the vane including:

a first transverse port for receiving lubricant upon rotation of said wheel hub on said axle;

a first radial passageway for directing lubricant flow from said first transverse port in a radially inward direction towards said axle;

a first axial port for directing lubricant flow from said first radial passageway in an axial direction within said lubricant cavity with respect to said axle, towards one of said inner and outer bearings; and a second transverse port for receiving lubricant upon opposite rotation of said wheel hub, a second radial passageway for directing lubricant flow from said second transverse port in a radially inward direction towards said axle, and a second axial port for directing lubricant flow from said second radial passageway in an axial direction with respect to the axle towards the other of said inner and outer bearings.

11. The vane of claim 10 wherein each axial port has a smaller cross-sectional area than the transverse port.

12. A wheel hub and bearing assembly mountable on a vehicle axle comprising:

a wheel hub having a longitudinal axis;

a pair of axially spaced bearings mounted within said wheel hub;

a lubricant cavity within said wheel hub between said axially spaced bearings adapted to be filled with a lubricant to lubricate and cool said bearings;

a vane disposed within said lubricant cavity in said wheel hub and extending radially outwardly with respect to the longitudinal axis of said wheel hub, the vane including, a first face facing a first direction of rotation of said hub on said vehicle axle, a second face facing a second direction of rotation of said hub on said vehicle axle, a passage having an entrance in the first face and an exit in the second face, wherein said exit of said passage is spaced radially inwardly from said entrance with respect to the longitudinal axis of the wheel hub; and an axial deflector disposed within said lubricant cavity in alignment with said exit of said passage for deflecting lubricant flow from said passage in an axial direction with respect to the longitudinal axis of said wheel hub towards one or more of said axially spaced bearings.

13. The Assembly of claim 12 wherein the vane further includes a second passage having an entrance in the second face and an exit in the first face, wherein said exit of said second passage is spaced radially inwardly from said entrance of said second passage with respect to the longitudinal axis of the wheel hub, the assembly further comprising a second axial deflector disposed within said lubricant cavity in alignment with said exit of said second passage for deflecting lubricant flow from said second passage in an axial direction with respect to the longitudinal axis of said wheel hub towards one or more of said axially spaced bearings.

* * * * *